Nov. 8, 1938.    H. V. STURTEVANT    2,136,156
CONVEYER
Filed March 17, 1937    2 Sheets-Sheet 1
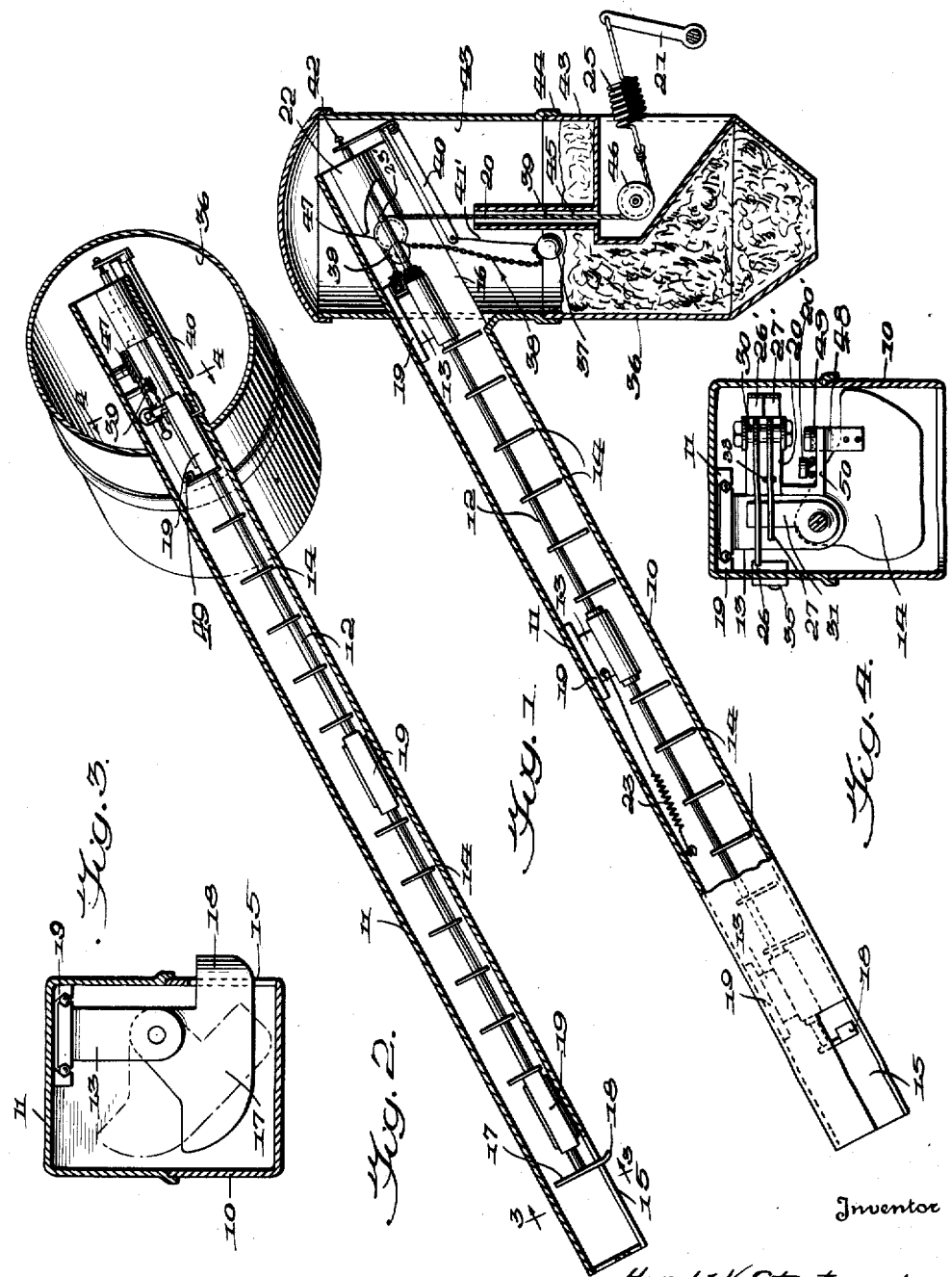
Inventor
Harold V. Sturtevant,
By Chas. M. Finkbower
Attorney

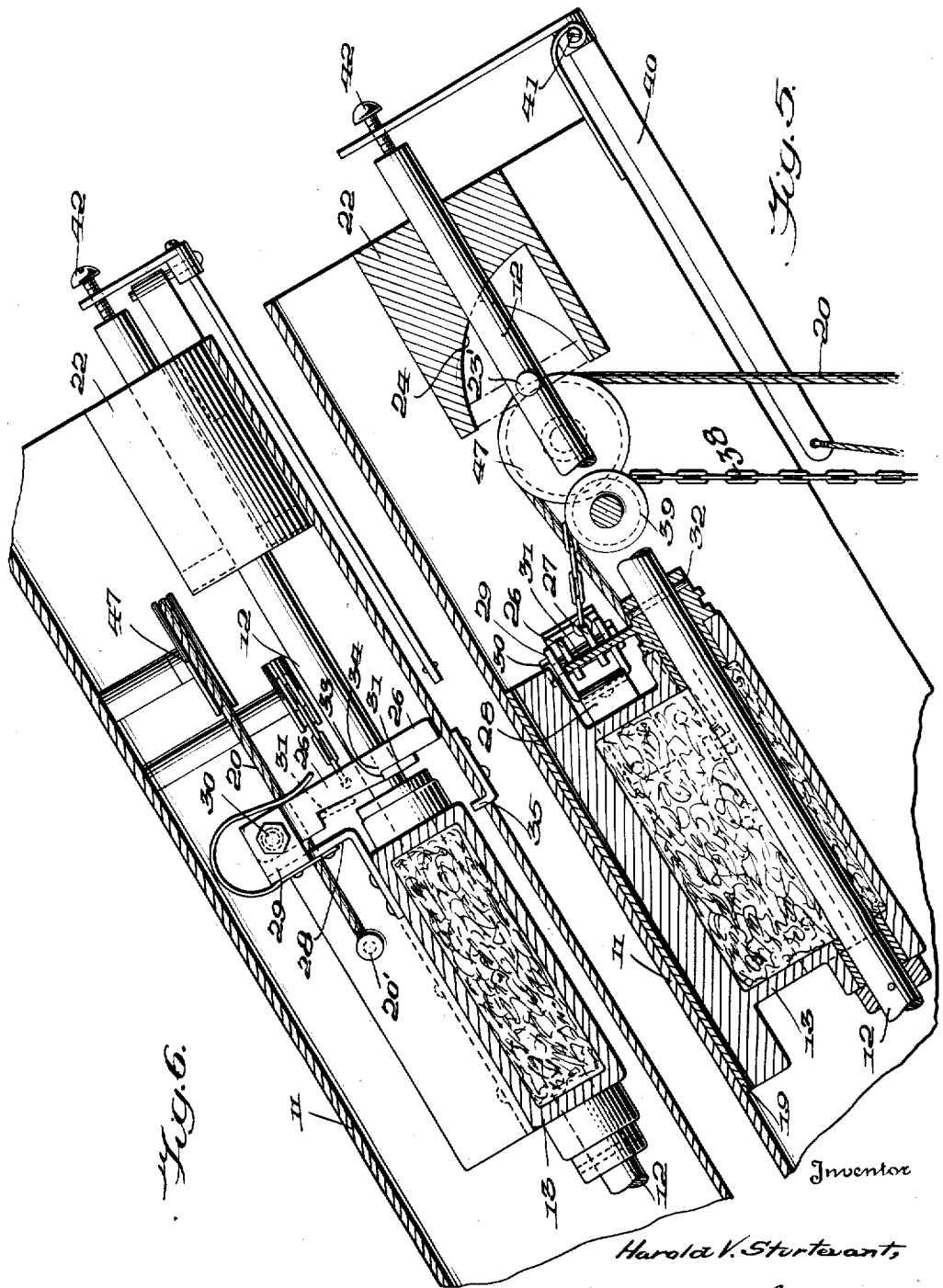

Patented Nov. 8, 1938

2,136,156

UNITED STATES PATENT OFFICE 2,136,156

CONVEYER

Harold V. Sturtevant, Norristown, Pa.

Application March 17, 1937, Serial No. 131,497

23 Claims. (Cl. 198—224)

This invention relates to conveyers and more particularly to conveyers of the reciprocating arm type which are adapted to handle loose material such as coal and ashes.

An important object of the present invention is to provide a reciprocable arm conveyer having a novel arrangement of blades for handling coal and ashes in conjunction with automatic stoker installations in an efficient, more quiet and economical manner than conveyer apparatus heretofore employed.

Another object of the invention is to provide a conveyer of the character designated having a novel operating mechanism which shall be more durable and rugged in construction and more reliable in operation than similar conveyers heretofore proposed, and which shall reduce inspection, repair and replacement costs to a minimum.

Another object of the invention is to provide a conveyer of the character designated having a novel arrangement of power mechanism for operating the conveyer.

Another object of the invention is to provide a novel conveyer construction in which the feed members shall present a minimum amount of resistance to the movement of the material and effectively prevent clogging or jamming of the materials during transit through the conveyer conduit or chute.

Another object of the invention is to provide a novel arrangement of material moving blades for gathering material at the inlet of the conveyer and moving it to the discharge outlet.

Another object of the invention is to provide a novel mechanism for controlling the movement of the blades to render them self cleaning and positive in operation under a wide variety of material handling conditions.

A further object of the invention is to provide a conveyer of the character designated having a novel material control mechanism which shall render the mechanism inoperative upon accumulation of excess material at the discharge outlet.

These and other objects of the invention will be more apparent from the following specification and drawings and more particularly set forth in the claims:

In the drawings:

Figure 1 is a view in elevation and partially in section showing the conveyer assembly;

Figure 2 is a plan view of the apparatus shown in Fig. 1;

Figure 3 is a sectional view on line 3—3, Fig. 2 showing the material gathering blade;

Figure 4 is a sectional view on line 4—4, Fig. 2 showing the stroke and governor control latches;

Figure 5 is an enlarged elevational view showing a section of the blade operating mechanism; and Figure 6 is a plan view of the apparatus shown in Fig. 5.

Referring to Figs. 1 and 2 of the drawings there is shown a material conveyer constructed and arranged in accordance with the present invention wherein a conveyer chute 10 is provided with a cover 11 to form a closed conduit for housing and supporting a reciprocable feed arm or shaft 12. This arm is suspended from the cover 11 by suitable slide bearings 13—13 so that a plurality of spaced apart blades 14—14 mounted on the shaft shall project into the material and move the same along the conduit as hereinafter more fully described. The conveyer conduit is provided with a side inlet opening 15 at one end and a discharge outlet 16 at the other end. Mounted on the shaft 12 and positioned adjacent the opening 15 is a blade 17 having a projection 18 particularly designed to gather material into the opening 15 in a novel manner as hereinafter more fully described.

The conveyer conduit is preferably of rectangular construction as shown in Figs. 3 and 4 and arranged to house or enclose substantially all of the operating mechanism therefor so as to provide a convenient and safe mechanism which shall reduce to a minimum any danger which is frequently caused by loose or exposed working parts. A conveyer of this type is particularly desirable for feeding fuel to the hopper of a stoker furnace, or it may be used with equal facility in conveying ash materials from the stoker furnace.

One important feature of the present construction is the novel manner of mounting and operating the feed arm 12 in the conveyer conduit so that it shall move with a reciprocatory and rocking motion. The arm 12 is suspended from the top wall of the conveyer conduit by slide bearings 13—13 which are retained in complementary ball-bearing trackways 19—19 secured to the top cover wall 11 in any suitable manner. It will thus be observed that by suspending the feeder arm 12 from the top or ceiling of the housing the moving parts of the bearings, as well as the shaft arm, are out of contact with the material and any resistance to the material being moved through the conduit is therefore reduced to a minimum.

The mechanism for imparting the desired reciprocatory movement to the feed arm 12 includes a cable 20 and power arm 21. The cable is connected to bearing 13 in any suitable manner as for example by a pin connection 20'. Rocking movement of the shaft 12 at the forward end of its stroke is imparted by a cam member 22 mounted in the end of the cenveyer adjacent the discharge opening 14. An important feature of this construction is that power is applied to the cable 20 for drawing the arm 12 forward, and on release of the blades from the material, as hereinafter described, the return stroke of the feed arm is effected by gravity with the aid of a spring 23 attached to a bearing 13 and cover 11. By thus applying a positive force on the forward or material moving stroke by means of a flexible cable and allowing gravity to return the arm, I am able to provide a conveyer having drive connections of a more simple, durable and efficient character. The cam 22 is adapted to receive the end of shaft arm 12 which carries a rigid cross pin 23'. This cross pin is adapted to engage a cam surface 24 and thus impart the desired rotary or rocking movement to the feed arm at the end of each forward stroke movement. The feature of this particular movement is that the material engaging blades 14 are lifted free of the material in the chute 11 and retained in elevated position during the return stroke movement for re-engagement with the material.

A particular feature of this manner of handling the material is that the material is always maintained in a loose condition during transit in the conduit and all danger of clogging or jamming of the feed arm mechanism is reduced to a minimum because the only mechanism in contact with the material is the blades during the forward movement of the material in the conveyer conduit. Should any dangerous obstruction be encountered, a safety relief member 25 is included in the drive cable connection 20 to relieve any undue strain.

After the blades 14 are lifted free of the material by the rocking movement imparted by the cam surface 24, the blades are retained in elevated position during the return movement of the feed arm by a novel latch mechanism carried by the bearing arms located adjacent to or above the discharge outlet 16. The latch mechanism is located in this position so that the same may be out of contact with the material and be readily accessible for inspection and repair whenever the same may be necessary for any reason. The mechanism for retaining the blades in elevated position on the return stroke includes a trip latch member 26 which is brought into operation at the end of each forward stroke of the feed arm 12. Associated with this latch is another latch member 27 for controlling the elevation of the blades to render them inoperative upon excess material accumulating at the discharge end of the conveyer.

The latch members 26 and 27 are both mounted on the bearing arm 13 by a bracket member 28 having a U shaped head portion 29. The members 26 and 27 are swingably mounted in this head in superimposed relation by a pivot pin 30 and each latch is retained in proper position by leaf springs 26' and 27' respectively, as shown in Figs. 4 and 5. A latch arm 31 is keyed to the feed arm shaft 12 by a pin 32 so that it shall swing in the path of the latches 26 and 27 as it is rocked by the cam 22 and thus control the movement of the blades relative to the material.

The operation of the stroke latch for regulating the normal operation of the blades is as follows: Assuming that the feed arm is moving material on the forward stroke, the latch arm 31 will be in the position as shown in dotted lines, Fig. 6, and at the completion of the stroke the cam 22 will rock the shaft 12 to elevate the blades and move the arm 31 along the latch face and against the action of a keeper spring 26' to the full line position in a notch 33 on latch 26. While in this position the latch arm 31 will also be ahead of the latch 27 as shown by dotted line 34, Fig. 6. The feed arm with its blades elevated will be retained in this position until member 26 is released on the return stroke by a trip member 25 mounted on the conduit wall 11. This trip member is arranged to trip the latch 26 and release the arm 31 at the limit of the return stroke of the feed arm and thus permit the blades to again rotatably engage or cut into the material preparatory to another progressive forward movement.

Material from the conveyer outlet 16 is delivered to a receiving hopper 36 associated therewith and if for any reason material should be discharged into the hopper faster than it can be used, the blades 14 are rendered inoperative by the governor latch 27 and a governor ball weight 37 located in the hopper. The weight 37 is connected to the latch 27 by a chain connector 38 which is carrier over a pulley 39.

During the normal operation of the conveyer, when the feed arm 12 is at the end of the down stroke, the chain 38 is pulled taut and retracts latch 27 simultaneously with the tripping of latch 26 by the trip member 35, thereby unlatching the arm 31 and allowing the shaft 12 to rock and permit the blades 14 to engage material in the chute.

In order for incoming material to flow under the governor weight 37, it is lifted at each stroke of the feed arm 12 by a bell crank lever 40 pivotally mounted on the conveyer casing 11 as indicated by the numeral 41. One arm of the bell crank is connected to the ball by a connection 41' and the other arm projects into the path of movement of the shaft 12. The extent of movement of the bell crank is regulated by a set nut member 42 on the crank arm. It will thus be observed that as the level of the material being handled rises in the hopper due to the supply being greater than the demand, then the governor ball will take a high position as on its down stroke it comes to rest on a higher level of material. The ball resting at the higher level, then at the end of the down stroke of shaft 12 the chain is not tightened to retract the latch 27 and the arm 31 is retained in upright position by this latch to render the vertically aligned notch 33 of stroke latch 26 ineffective when engaged by trip 35. The stroke latch being rendered ineffective, the blades are retained in elevated position and out of engagement with the material until released by the governor latch 27.

Another important feature of this construction is the provision of a rotatable hopper section 43 so that it may be shifted angularly relative to the casing portion of the conveyer discharge outlet as indicated by the joint connection 44. This arrangement, together with combining the flexible cable drive for reciprocating the feed arm, facilitates the installation of these conveyers when used to transport coal from a bin to a stoker hopper, for example. In such instances the conveyer may be swung at any horizontal angle without affecting the drive parts or any change in construction to adapt it to any particular arrangement. Furthermore, by using a cable drive and passing it through the hopper at the central position thereof as indicated by a tubular member 45, enables the conveyer to be shifted at any desired angular position without affecting or changing the drive because of the flexible connection. It will also be noted the drive cable pulley 46 mounted in the hopper compartment is in substantial alignment with a line cable pulley 47 mounted in the top wall of the conveyer housing 11.

Another feature of the proposed construction is to render the same more quiet in operation and adapt the apparatus for use with domestic stoker installation is the cushioning movement of the action of the rocking movement of the blades when released at the end of the return stroke. The cushioning action is affected by an angle bumper member 48 secured to a blade 14 adjacent to one of the bearings 13 and provided with a yieldable head 49. This head engages an angular shaped stop member 50 mounted on the bearing 13 as shown in Fig. 4.

An important feature of the side inlet opening 15 for receiving material into the conveyer is that the feed shaft 12 with its material moving blade 17—18 is always free to gather material without crowding or jamming. This is accomplished by causing the blade portion 18 to move outside the conveyer housing to agitate and gather the material only on the forward stroke of the feed shaft with the attached blades 14—14. At the end of the forward stroke the gathering blade 17 is retracted within the conduit as shown in Fig. 3 so that it returns unobstructed because it is protected by the sides of the conduit housing. At the end of the return stroke the blade 17 is lowered and gets behind any material in the conduit and moves the same forward as it begins the forward stroke. Furthermore, the design of this gathering blade 17—18 is such that it reduces to a minimum any tendency of bridging or failure of the material to flow which frequently occurs when the material is moist.

A conveyer embodying the proposed construction is also particularly adapted to handle all kinds of foreign matter such as bolts, nails, large pieces of stone or slate because if one or more of the blades fall on large pieces of refuse when they drop back into the material, a few conveying or up strokes may be made with the blades in the elevated position and then one blade will fall behind the large piece and carry it along to the delivery end of the conveyer. Furthermore, by providing a cable line including a yieldable connection for drawing the conveyer arm to move materials, even though a rigid obstruction may be temporarily encountered. This construction is of particular importance in that all use of safety sheer pins is eliminated and the device is ready to convey materials as soon as any strain is relieved.

I claim:

1. In a conveyer, a conduit housing having an opening in the side thereof for receiving material, a reciprocable feed shaft having a plurality of feed members mounted thereon for moving material through the conduit, means for imparting a rocking and reciprocatory movement to said feed members, and means actuated by the shaft for agitating material adjacent to the opening.

2. Apparatus of the character described in claim 1 in which the agitating means includes one of the feed members arranged to project through the opening to gather material on the forward movement of the feed shaft and be retracted within the conduit and free of the outside material on the return movement of said shaft.

3. Apparatus of the character described in claim 1 in which the feed members comprise transversely extending depending blades, bearings for slidably mounting the feed shaft at the top portion of the conduit and out of contact with the material, and means forming an integral part of the agitator for gathering material and feeding it into the conduit.

4. In a conveyer, a conduit having an opening at one end for receiving material and a discharge outlet at the other end, a reciprocable feed shaft suspended in said conduit and out of contact with the material, a plurality of spaced radially extending blades mounted on said shaft, means located in the conduit near the discharge outlet for maintaining the blades in a horizontal material engaging position during a forward movement and then rocking the blades to elevate them free of the material, and means for retaining the blades in elevated position during the return movement of the shaft.

5. Apparatus of the character described in claim 4 in which the retaining means includes a latch member for holding the blades elevated during the return movement of the shaft, and means for tripping the latch to release the blades to material engaging position at the end of said movement.

6. Apparatus of the character described in claim 1 including a plurality of slidable bearing members for suspending the feed shaft in said conduit, and one of said bearing members carrying a latch element for engaging the feed shaft to retain the feed shaft blades in the desired elevated position.

7. Apparatus of the character described in claim 4 including means for cushioning the rocking movement of the feed shaft in the conduit.

8. Apparatus of the character described in claim 4 including means for yieldably influencing the reciprocable movement of the feed shaft in the conduit.

9. Apparatus of the character described in claim 4 in which the material discharge is regulated by a latch member carried by the feed shaft, a material engaging member connected to the latch through said discharge opening, and means for agitating the material member to maintain it free of the discharged material.

10. In a conveyer, the combination of an inclined material transporting conduit, a reciprocable feed shaft housed within said conduit for progressively moving material through said conduit to a discharge outlet, an angularly adjustable material receiving hopper connected to said outlet, power mechanism including a flexible cable located centrally of the hopper and connected to the feed shaft through said discharge outlet to impart reciprocatory movement to said shaft.

11. In a conveyer, the combination of an inclined conduit, a reciprocable and rockable feed shaft having material engaging blades enclosed therein, power means for positively moving the feed shaft on the forward stroke, means for rocking the feed shaft to elevate the blades free of the material at the end of each forward stroke, and latch means to retain the blades in elevated position and permit the feed shaft to gravitate on the return stroke.

12. In a conveyer, the combination of an inclined conduit, a reciprocable and rockable feed shaft having material engaging blades enclosed therein, power means for positively moving the feed arm on the forward stroke, means for rocking the feed shaft to elevate the blades free of the material at the end of each forward stroke, latch means to retain the blades in elevated position and yieldable means for actuating the shaft on the return stroke.

13. Apparatus of the character designated in claim 12 in which the power means includes a flexible cable mounted in the upper end of the conduit and connected to the feed shaft.

14. In a conveyer, the combination of an inclined material transporting conduit, comprising a chute portion and a housing portion covering the same, a reciprocable and rockable feed shaft mounted in said housing and having depending blades extending into the chute for moving material from an inlet at the lower end to a discharge outlet at the upper end, and power mechanism for actuating the feed shaft including a flexible cable for positively moving the feed shaft on the forward stroke and yieldable means for actuating the shaft on the return stroke.

15. Apparatus of the character described in claim 14 in which the power cable extends through the discharge outlet, a rotatable material receiving hopper associated with the outlet and adapted to accommodate the power cable at the central portion thereof, whereby the conveyer may be angularly adjusted relative to the hopper without affecting the power mechanism.

16. In a conveyer, the combination of an inclined material transporting conduit, comprising a chute portion and a housing portion covering the same, a reciprocable and rockable feed shaft mounted in said housing and having depending blades extending into the chute for moving material from an inlet at the lower end to a discharge outlet at the upper end, power mechanism for actuating the feed shaft including a flexible cable for positively moving the feed shaft on the forward stroke and yieldable means for actuating the shaft on the return stroke, cam means located in the conduit for engaging the feed shaft to impart a rocking movement thereto at the end of each forward stroke to release the blades from the material, and latch means for retaining the blades out of the material on the return stroke.

17. In a conveyer, the combination of an inclined conduit having a side inlet opening at the lower end and a bottom discharge outlet at the upper end of said conduit, a reciprocable and rockable feed shaft located in said conduit and having depending blades for progressively moving material from the inlet to the outlet, one of said blades adapted to move through the inlet to gather material into the conduit on the forward stroke of the shaft and be retracted within the conduit on the return stroke, and power means for imparting a reciprocatory and rocking movement to said feed shaft.

18. In a conveyer, a conduit having a side opening at one end for receiving material, a feed shaft for moving material through the conduit, a material gathering member located on the shaft and adapted to move adjacent to the opening, and means for imparting a rocking and reciprocatory motion to said shaft whereby the material gathering member moves in and out of the opening during the reciprocatory movement of the feed shaft.

19. In a conveyer, a conduit having a side opening at one end for receiving material, a reciprocatory feed shaft mounted in the conduit and having a plurality of spaced depending blade members for moving material through said conduit, one of said blades having a material engaging projection adapted to extend through the opening and agitate material outside the conduit, and means for rotating the feed shaft to elevate the blades free of the material on each return movement thereof, whereby the blade projection adjacent the opening shall direct material into the conduit only on the forward working stroke and be retracted within the conduit on the return movement.

20. Apparatus of the character described in claim 4 including a stop element on the conduit wall for tripping the retaining means at the end of the return movement of the feed shaft.

21. Apparatus of the character described in claim 4 including means for controlling the action of the blade retaining means in response to the excess of material discharged from the conveyer.

22. Apparatus of the character described in claim 4 including means for tripping the retaining means at the end of the return movement of the feed shaft, and means actuated by excess material for rendering the tripping means ineffective.

23. Apparatus of the character described in claim 4 in which the blade retaining means includes a latch arm mouned on the shaft, a pair of spring pressed latch members mounted on an adjacent bearing for engaging the arm, a stop member on the conduit wall for tripping one of the latch members to control the rocking movement of the shaft, and means controlled by excess accumulation of material for actuating the other latch to render the first latch ineffective to control the blades.

HAROLD V. STURTEVANT.